E. N. WARD.
ANIMAL HALTER RELEASING DEVICE.
APPLICATION FILED AUG. 1, 1919.
1,357,133.
Patented Oct. 26, 1920.
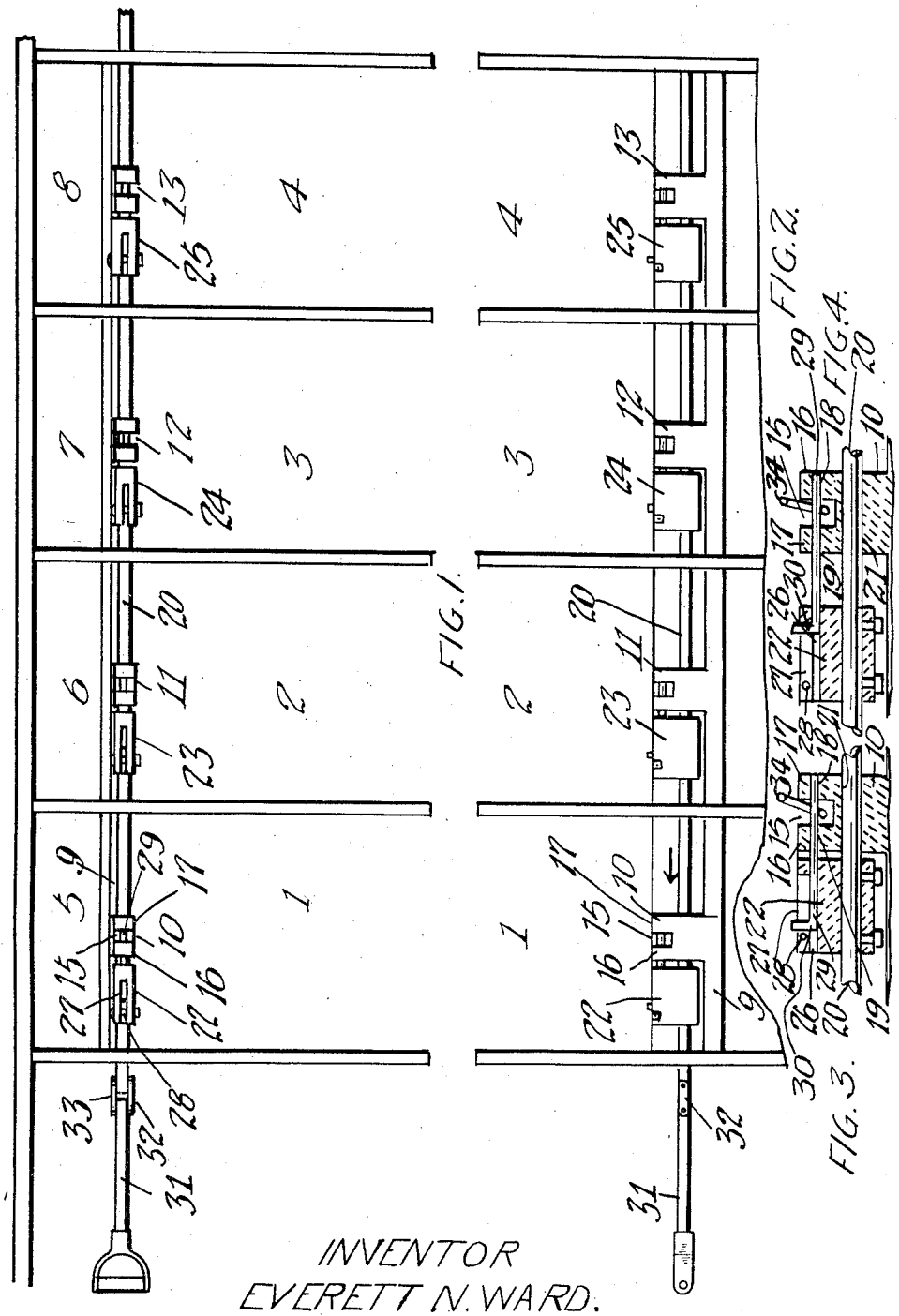
INVENTOR
EVERETT N. WARD.
By Featherstonhaugh Co
ATTYS

UNITED STATES PATENT OFFICE.

EVERETT NELSON WARD, OF WEST MONKTON, ONTARIO, CANADA.

ANIMAL-HALTER-RELEASING DEVICE.

1,357,133. Specification of Letters Patent. Patented Oct. 26, 1920.

Application filed August 1, 1919. Serial No. 314,621.

*To all whom it may concern:*

Be it known that I, EVERETT NELSON WARD, of the village of West Monkton, in the county of Perth, in the Province of Ontario, Canada, have invented certain new and useful Improvements in Animal-Halter-Releasing Devices, of which the following is a specification.

My invention relates to improvements in animal halter releasing device and the object of the invention is to devise a simple means whereby a number of animals, each in an individual stall, may be simultaneously released, or when desired any animal individually from the rest, and it consists essentially of the following arrangement and construction of parts as hereinafter more particularly explained.

Figure 1 is a plan view of a series of animal stalls showing my device attached thereto.

Fig. 2, is a front elevation of the upper portion of the stall showing my device in its place in front of the manger.

Fig. 3, is an enlarged sectional detail of my halter locking device shown in the locked position.

Fig. 4, is a similar view to Fig. 3 showing the locking device in the intermediate position for releasing any one of the animals individually.

In the drawings like characters of reference indicate corresponding parts in the various figures.

1, 2, 3, 4, are a series of stalls provided with the usual mangers 5, 6, 7, and 8. 9 is a bar which is secured to the front of each manger and from which extend upwardly projecting members 10, 11, 12, and 13, one member being located in each stall. Each member 10, 11, 12, and 13 is provided with a central notch 15 forming upwardly extending lugs 16 and 17 through which extend orifices 18 and 19. 20 is a rod which is preferably a tubular rod and which is slidable in the orifice 21 extending through each of the projections 10, 11, 12, and 13 below the notches 15. 22, 23, 24, and 25 are blocks secured to the rod 20, the block 22 being adjacent to the projection 10, the block 23 adjacent to the projection 11, the block 24 adjacent to the projection 12, and the block 25 adjacent to the projection 13 when the parts are in their locked position. 26 is a bore which extends through each block 22, 23, 24 and 25 in alinement with the orifices 18 and 19 of the projections 10, 11, 12, and 13. 27 is an open ended slot formed in the upper portion of each part 22, 23, 24 and 25, such slot opening into the bore 26. 28 is a cross bolt which extends through each block so as to cross the slot in proximity to the open end thereof, thereby forming a closure for the open end of the slot. 29 is a locking pin which is slidably held in the bore 26 and when in the locking position extends through the orifices 18 and 19. 30 is a projection which extends upwardly from the pin 29 through the slot 27 and rests with the parts in the locking position against the cross bolt 28. 31 is a pull handle which is preferably connected to the rod 20 by links 32 and 33 so that the pull handle may be folded upward into the vertical position and thereby take up less room. 34 is an end link of the halter chain which is inserted in the notch 15 between the lugs 16 and 17 and through which the locking pin 29 extends.

If it is desired to release any one of the animals individually and retain the others secure, all that it is necessary to do is to pull upon the pull handle 31 so as to draw the rod 20 longitudinally in the direction of arrow (see Fig. 2) carrying the blocks 22, 23, 24 and 25 which are secured thereto in the same direction. During this operation the locking pins 29 remain in the stationary position, the projection 30 of the pin passing longitudinally of each slot 27 to the opposite end thereof, or from the position shown in Fig. 3 to the position shown in Fig. 4. The locking pin 29 may then be withdrawn by grasping the upper end of the projection 30 and drawing it longitudinally of the slot into contact with the cross bolt 28 thereby carrying the opposite end to open the notch 15 so as to release the link 34.

If, however, it is desired to release all the animals in the stable simultaneously, the rod 20 is drawn farther in the direction of arrow so that the projection 30 engages the end of the slot 27 in the position indicated in Fig. 4 so as to withdraw the pin 29 in each stall thereby releasing the animals.

From this description it will be seen that I have devised a very simple device whereby the animals in the stalls of the stable may be simultaneously and quickly released, which is of great advantage in case of fire where it is desired to release all the animals so that they may be removed from the stable and will at the same time furnish means whereby any one animal may be released from its stall without releasing the remaining animals in the stable.

What I claim as my invention is:

In an animal halter releasing device, the combination with the stall partition, of a rod supported in the stall partition and movable longitudinally, a stationary projection supported within each stall having a notch and having alined orifices extending through the side walls of the notch, a block secured to the rod in proximity to each projection and having a longitudinal slot and a locking pin slidably held within each block and provided with an outturned end extending through the slot and projecting at the opposite end of the block to pass longitudinally through the alined orifices of the projections crosswise of the slot of each projection when in the locking position.

EVERETT NELSON WARD.